United States Patent [19]

Sabet

[11] 4,009,691
[45] Mar. 1, 1977

[54] PORT CONTROL ARRANGEMENT IN A ROTARY-PISTON INTERNAL-COMBUSTION ENGINE

[76] Inventor: Huschang Sabet, Eduard-Pfeiffer-Str. 67, Stuttgart, Germany, D-7000

[22] Filed: Dec. 8, 1975

[21] Appl. No.: 638,341

[30] Foreign Application Priority Data

Jan. 10, 1975 Germany .......................... 2500755

[52] U.S. Cl. ................................ 123/8.47; 418/33
[51] Int. Cl.² ...................... F02B 55/14; F01C 1/00; F04C 17/00
[58] Field of Search .............................. 418/33–38; 123/8.47

[56] References Cited

UNITED STATES PATENTS

| | | | |
|---|---|---|---|
| 2,346,014 | 4/1944 | Downey | 418/36 |
| 3,282,258 | 11/1966 | Sinnott | 418/35 |
| 3,381,669 | 5/1968 | Tschudi | 123/8.47 |
| 3,779,215 | 12/1973 | Sabet | 418/34 |

Primary Examiner—John J. Vrablik
Attorney, Agent, or Firm—Hans Berman

[57] ABSTRACT

In an internal-combustion engine having a cylindrical casing and two sets of pistons mounted in the casing for rotation about the casing axis and for angular reciprocating movement of one set relative to the other set, whereby combustion chambers between the two sets alternatingly expand and contract, the circumferential faces of all pistons sealingly engage the casing wall, the circumferential faces in one set of pistons being much wider than in the other set. Recesses in each of the wide faces bound an elongated land obliquely inclined relative to the casing axis while the narrow circumferential faces are axially elongated. The ports in the casing wall alternatingly opened and closed by the piston faces are parallelogram-shaped, two sides of each parallelogram being parallel with the direction of elongation of the lands, the other two sides being parallel with the narrow circumferential faces when the ports are covered by the faces respectively.

10 Claims, 5 Drawing Figures

PORT CONTROL ARRANGEMENT IN A ROTARY-PISTON INTERNAL-COMBUSTION ENGINE

This invention relates to internal combustion engines having rotary pistons, and particularly to an improved port control arrangement in an engine of the type disclosed in my earlier U.S. Pat. No. 3,779,215.

The engines with the improvement of which this invention is particularly concerned have a casing of circular cross section at right angles to its axis, a cylindrical casing being merely representative. Two sets of pistons are mounted in the casing for angular movement relative to each other between two terminal positions and for rotation about the casing axis. Each piston has two radially extending faces, and such faces circumferentially define combustion chambers in the casing between respective pistons of the two sets. Respective circumferential faces of the pistons sealingly engage the casing, the faces in one set of pistons having an angular width relative to the casing axis which is substantially greater than the angular width of the circumferential faces of the pistons in the other set. The wider circumferential faces are each formed with two recesses open in respective, opposite, circumferential directions toward respective combustion chambers and in a radially outward direction toward the casing which is formed with a pair of ports for taking in a combustion fuel mixture and for exhausting the spent mixture after ignition and expansion in a known manner.

While the earlier invention has provided beneficial control of the working fluid, particularly in compensating for the unequal movements of the two sets of pistons and for the different circumferential dimensions of their faces which alternatingly cover and open the ports in the casing wall, the combustion spaces defined by the combustion chambers and communicating recesses in the earlier engine have been found not to provide the best possible propagation of combustion in the fuel mixture, and to link the timing of intake and exhaust in a manner not suited for best fuel economy with certain fuel mixtures.

It is primary object of the instant invention to modify the engine of the afore-mentioned patent in such a manner as to provide combustion spaces of more favorable shape and to permit independent selection of port opening and closing times.

According to one aspect of the instant invention, the two recesses in each of the wider circumferential piston faces define therebetween an elongated land of the wider face, and the direction of elongation of each land is differently inclined relative to the casing axis than the direction of elongation of the narrower piston faces, each direction of elongation having an axial component.

Other features, additional objects, and many of the attendant advantages of this invention will readily be appreciated as the same becomes better understood by reference to the following detailed description of preferred embodiments when considered in connection with the appended drawing in which.

Figure 1:
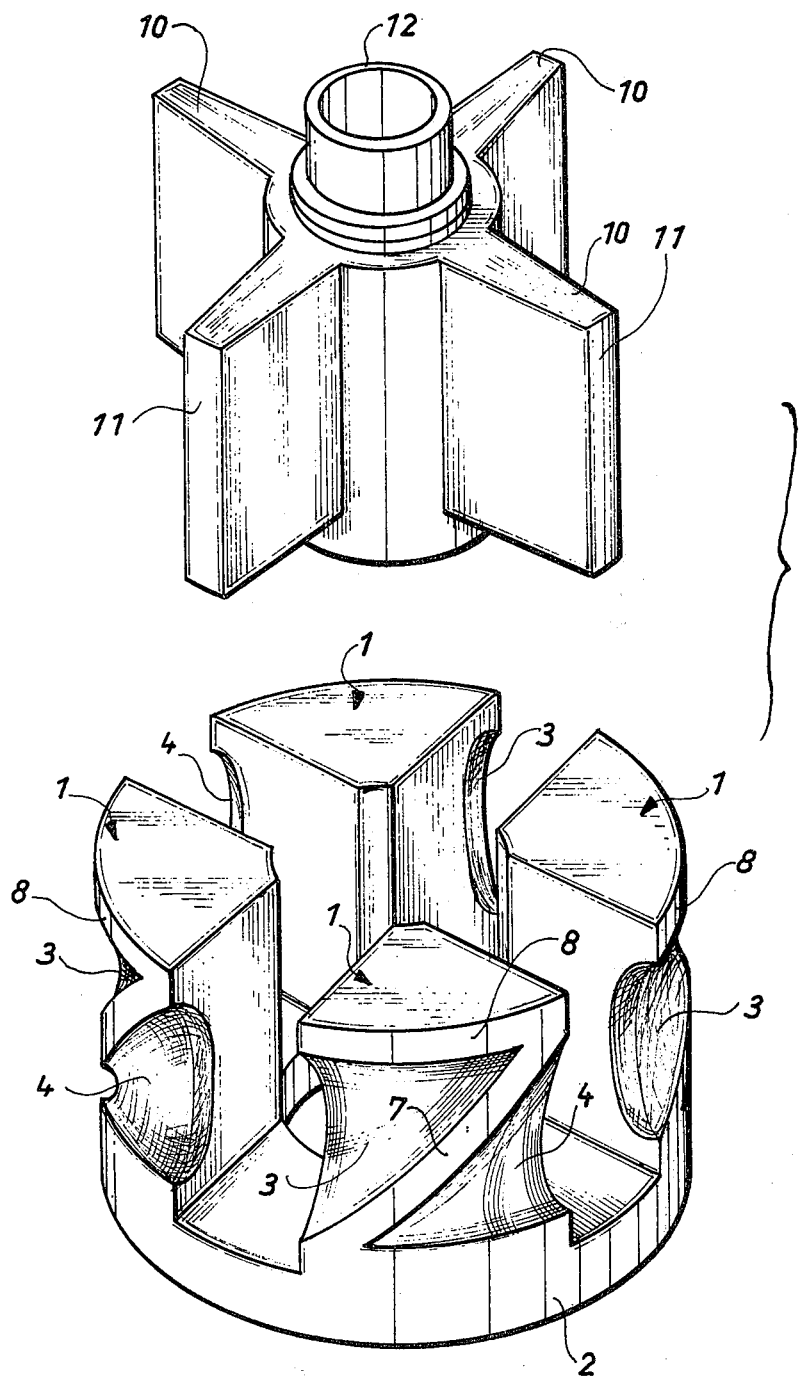
FIG. 1 is an exploded, perspective view of the two sets of pistons in an engine of the invention.

Referring initially to FIG. 1, there is shown only as much of a rotary-piston engine of the type disclosed and claimed in my earlier patent as is needed for an understanding of this invention, known elements being largely omitted since they are familiar from the earlier patent and my previous U.S. Pat. No. 3,376,080.

The four identical pistons 1 of the engine illustrated are fixedly mounted on or integral with an axially short, cylindrical plate 2 which normally closes the cylindrical engine casing in one axial direction and carries the output shaft of the engine. The shaft rotates continuously at uniform speed during operation of the engine, the casing and shaft having been omitted from FIG. 1. The basic shape of each piston 1 is that of the sector of a cylinder. The wide circumferential face of each piston 1 is formed with two identical recesses 3, 4 which are open in a radially outward direction toward the cylindrical casing wall, not seen in FIG. 1, and respectively open in opposite, circumferential directions, the shape and position of each recess 3, 4 being such as to leave two circumferentially elongated lands 8 of the cylindrically arcuate piston face in two axially spaced planes, and an elongated land 7 obliquely inclined relative to the axis of the piston set at an angle of about 45° and connecting respective circumferentially terminal portions of the lands 8, each of the lands 7, 8 being of uniform width over its entire length.

The second set of pistons consists of four plates 10 fixedly fastened to or integral with a common, tubular hub 12. Each plate 10 is symmetrical relative to a plane through the axis of the piston set and of uniform cross section over its axial length. It tapers circumferentially in a radially outward direction toward a circumferentially narrow and axially elongated face 11. The pistons 10 are equiangularly spaced about the axis of the second set, as the pistons 1 are spaced about the axis of the first set of pistons.

In the assembled condition of the engine, each piston 10 is circumferentially interposed between two pistons 1, the cylindrically curved faces 11 and the lands 7, 8 are equidistant from the common axis of the two sets of pistons, and the two generally radially extending faces of each piston 10 circumferentially bound two chambers with respective radially extending faces of two pistons 1. During normal engine operation in a known manner, each narrow piston 10 is moved by non-illustrated, known gearing relative to the two circumferentially adjacent pistons 1 between two terminal positions respectively illustrated in FIGS. 2 and 3 in which the cylindrical inner casing wall 9 and openings therein are shown in phantom view since they are located above the developed plane of FIGS. 2 and 3.

The lands 7, 8 and the piston faces 11 sealingly engage the inner casing wall 9, and sealing ribs are preferably provided for this purpose as shown in my earlier patents, but omitted here for the sake of simpler pictorial representation. Other non-illustrated ribs axially seal the pistons 10 to the plate 2, and the pistons 1, 10 to the other radial casing wall not shown in the drawing.

Figure 2:
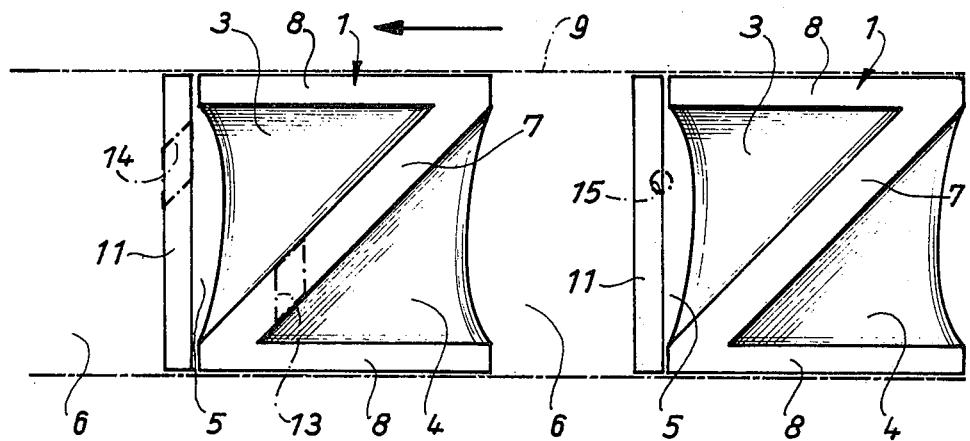
FIG. 2 is a developed, fragmentary view of the same engine, the casing being shown in phantom view, and the pistons being in one dead center position.

In the condition of the engine shown in FIG. 2, the oblique land 7 of one piston 1 covers an exhaust port 13 in the casing wall 9 while an intake port 14 is covered, and therefore sealed, by a narrow, axial piston face 11. A chamber 5 bounded circumferentially by the pistons 1, 10 is in its terminal condition in which its capacity is at a minimum. During subsequent movement of all pistons in the direction indicated in FIG. 2 by an arrow, the piston face 11 will be moved faster than the piston 1 so that the expanding chamber 5 will receive fresh fuel mixture through the intake port 14 which provides the sole outward connection for the chamber 5.

The cooperating pistons 1, 10 shown on the right of FIG. 2 bound a chamber 5 filled with compressed fuel mixture and aligned with a spark plug 15 in the casing wall 9 for ignition of the fuel mixture in the chamber 5 and in the recess 3 which tapers uniformly inward from the chamber. The chamber 6 in the center of FIG. 2 and the communicating recess 4 are filled with spent combustion gases in the position of FIG. 2, and the gases will be expelled through exhaust port 13 as the pistons move from the position of FIG. 2 toward that of FIG. 3 in which, after expulsion of combustion gases, the port 13 is sealingly covered by a narrow piston face 11.

The engine thus operates in a conventional four-stroke cycle, and the number of intake and exhaust ports and ignition devices, such as the spark plug 15, is chosen to suit the number of pairs of pistons in each set. The recesses 3, 4 in the pistons 10, which are wide open toward the chambers 5, 6 provide combined spaces in which combustion of the fuel mixture is smoothly propagated.

The ports 13, 14 have each the shape of parallelogram. Two sides of the parallelogram are parallel to the engine axis and thus to the direction of elongation of the narrow piston faces 11, the transverse spacing of the axial parallelogram sides being practically identical with the uniform width of the rectangular piston face 11. The other two sides of the parallelogram defining each port 13, 14 are inclined relative to the casing axis at the same angle as the direction of elongation of the oblique, rectangular land 7 so that the edges of the land 7 are parallel to respective edges of a port 13, 14 when the land 7 is radially superposed on the port. The spacing of the oblique parallelogram sides is equal or practically equal to the transverse width of each land 7.

As is evident from the drawing, the widths of the faces 11 may be selected entirely independently of that of the lands 7 to suit other requirements without interfering with the opening and closing of the ports, and the prevention of gas flow between adjacent chambers 5, 6.

If it is desired that a port be fully closed to prevent gas flow between the chambers on opposite circumferential sides of a piston 1 while permitting restricted communication of the same port with chambers separated by a narrow piston 10, or vice versa, the port may be widened in one direction only. Other variations in the dimensions of the parallelogram-shaped ports will readily suggest themselves and are partly illustrated in FIGS. 4 and 5 which, except as described below, show apparatus identical with that seen in FIGS. 1 to 3.

Figure 3:
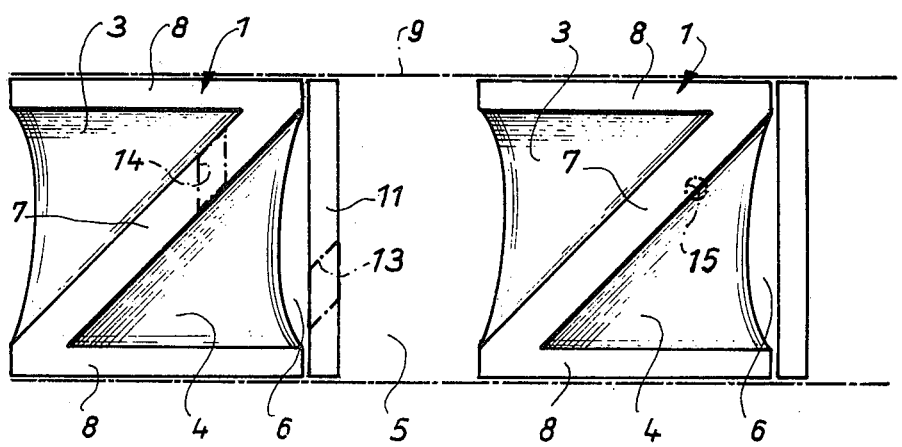
FIG. 3 illustrates the apparatus of FIG. 2 in the other dead center position of the pistons.
Figure 4:
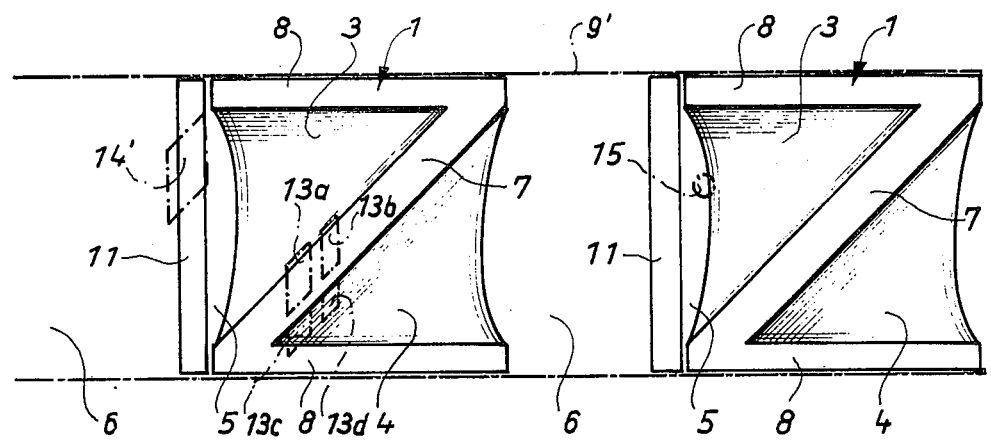
FIGS. 4 and 5 show a modified engine in respective views and positions corresponding to those of FIGS. 2 and 3.
Figure 5:
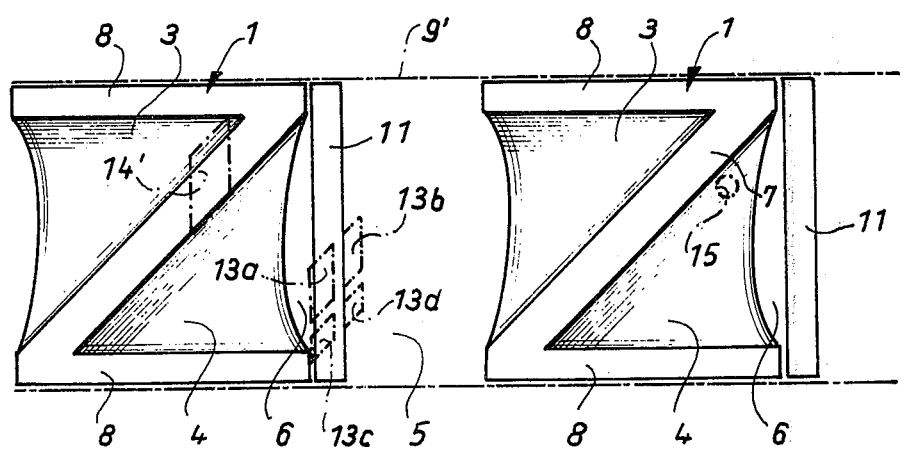

The circumferential width between the axial sides of the intake port 14' shown in FIGS. 4 and 5 is enlarged as is the spacing of its oblique edges as compared to the afore-described port 14. The connection between the leftmost chamber 6 in FIG. 4 with the intake port 14' is thus interrupted by a narrow piston face 11 at a later time in the cycle as in the otherwise analogous apparatus of FIG. 2. As is seen from FIG. 5, the circumferential widening of the port 14' does not affect the timing of the cut-off of the chamber 5 from the intake port 14' as compared to the condition illustrated in FIG. 3.

The exhaust arrangement illustrated in FIGS. 4 and 5 includes four ports 13a–13d of which each constitutes a parallelogram whose sides are aligned with the narrow piston faces 11 and lands 7 respectively, as described above, and which jointly define a parallelogram satisfying the same conditions. Each of the four ports 13a–13d is dimensioned to be sealed by a narrow piston face 11 or a land 7, while the four ports jointly provide a large flow section for rapid and complete exhaustion of spent fuel mixture. By providing each of the exhaust ports with a separate length of exhaust duct, undesirable flow of gases across a land 7 or piston face 11 may be avoided in a position in which all four ports 13a–13d are partly exposed in different recesses 3, 4.

While a spark plug has been indicated at 15 in the casing wall 9 of FIGS. 2 and 3, and in the corresponding casing wall 9' shown in FIGS. 4 and 5, the invention is equally applicable to engines equipped for hot-bulb ignition. The position of the hot bulb is readily chosen to prevent premature ignition and the resulting temperature increase of the hot bulb and progressive advance of the ignition time. If the engine of the invention is operated with a spark plug, the latter may be operated at relatively high temperature, as is desirable in lean fuel mixtures, because ignition can be timed to coincide with the necessary optimum position of the spark plug in one of the chambers 5, 6 or one of the recesses 3, 4.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a rotary-piston, internal-combustion engine having a casing of circular cross section at right angles to an axis of said casing, two sets of pistons mounted in the casing for angular movement relative to each other between two terminal positions and for rotation about said axis, each piston having two radially extending faces, said faces circumferentially defining chambers in said casing between respective pistons of said sets, respective circumferential faces of said pistons sealingly engaging said casing, the circumferential faces of the pistons in one of said sets having an angular width relative to said axis substantially greater than the angular width of the circumferential faces of the pistons in the other set, each piston in said one set being formed with two recesses in the circumferential face thereof, said recesses being open in respective opposite circumferential directions toward respective chambers and in a radially outward direction toward said casing, said casing being formed with a pair of ports, the improvement which comprises:
  a. said two recesses defining therebetween an elongated land of the circumferential face of each piston in said one set;
  b. the circumferential faces of the pistons in said other set being elongated;
  c. the direction of elongation of each of said lands and the direction of elongation of each of said circumferential faces of the pistons of said other set having each an axial component;

d. said directions of elongation being differently inclined relative to said axis.

2. In an engine as set forth in claim 1, each recess being open in one circumferential direction toward one of said chambers and being closed in the other circumferential direction, the axial dimension of said recess tapering uniformly from said one chamber in said other circumferential direction.

3. In an engine as set forth in claim 1, said ports having each the shape of a parallelogram having one pair of sides substantially parallel to one of said directions of elongation and another pair of sides substantially parallel to the other direction of elongation in respective angular positions of said pistons.

4. In an engine as set forth in claim 3, the spacing of the sides parallel to the direction of elongation of each of said lands being substantially equal to the width of each of said lands, said width being uniform.

5. In an engine as set forth in claim 3, the spacing of the sides of said ports parallel to the direction of elongation of each of said circumferential faces of the pistons of said other set being substantially equal to the width of each of the last-mentioned circumferential faces, said width being uniform.

6. In an engine as set forth in claim 3, said ports being offset axially from each other.

7. In an engine as set forth in claim 3, the direction of elongation of the circumferential faces of the pistons of said other set being substantially parallel to said axis.

8. In an engine as set forth in claim 7, the direction of elongation of each of said lands being obliquely inclined relative to a plane perpendicular to said axis.

9. In an engine as set forth in claim 8, said direction of elongation of each of said lands being inclined at an angle of substantially 45° relative to said plane.

10. In an engine as set forth in claim 8, said two recesses in the circumferential face of each piston of said one set further defining respective additional lands of said circumferential face, said additional lands being elongated in two spaced planes perpendicular to said axis, said obliquely elongated land connecting respective circumferentially terminal portions of said additional lands and being circumferentially coextensive with said additional lands, each of said lands being of substantially uniform width over the entire length thereof.

* * * * *